(12) United States Patent
Ettlinger

(10) Patent No.: US 7,824,544 B2
(45) Date of Patent: Nov. 2, 2010

(54) DEVICE FOR CONTINUOUSLY FILTERING MATERIAL MIXTURES

(75) Inventor: Roderich Ettlinger, Augsburg (DE)

(73) Assignee: Ettlinger Kunststoffmaschinen GmbH, Konigsbrunn (DE)

( * ) Notice: Subject to any disclaimer, the term of this patent is extended or adjusted under 35 U.S.C. 154(b) by 993 days.

(21) Appl. No.: 10/596,654

(22) PCT Filed: Oct. 23, 2004

(86) PCT No.: PCT/EP2004/011999
§ 371 (c)(1), (2), (4) Date: Dec. 13, 2006

(87) PCT Pub. No.: WO2005/063357
PCT Pub. Date: Jul. 14, 2005

(65) Prior Publication Data
US 2007/0068867 A1 Mar. 29, 2007

(30) Foreign Application Priority Data
Dec. 20, 2003 (DE) .............................. 203 19 752 U

(51) Int. Cl.
*B29C 47/68* (2006.01)
(52) U.S. Cl. .................... 210/90; 210/106; 210/107; 210/396
(58) Field of Classification Search .............. 210/87, 210/90, 106, 107, 372, 386, 396, 415
See application file for complete search history.

(56) References Cited

U.S. PATENT DOCUMENTS 4,021,343 A * 5/1977 Tyler ..................... 210/110
4,159,953 A * 7/1979 Paquette .................. 210/396

(Continued)

FOREIGN PATENT DOCUMENTS

AT    410759 B    *    6/2003

(Continued)

OTHER PUBLICATIONS

AT 410759 B, English Abstract Jun. 2003.*

(Continued)

*Primary Examiner*—Terry K Cecil
(74) *Attorney, Agent, or Firm*—Martin Fleit; Paul D. Bianco; Fleit Gibbons Gutman Bongini & Bianco PL

(57) ABSTRACT

The invention relates to a device which is used to continuously filter material mixtures, in particular for separating impurities from plastic melts. The device includes a hollow cylindrically-shaped filter element (2) which is arranged inside a housing (1), an annular chamber (22) which is defined from the outside of the filter element (2) and an inner wall of the housing, and at least one stripper (23) which can be pressed onto the filter body by an adjusting device. The stripper is used to remove the impurities detained on the filter element (2) due to a relative movement of the filter element (2) and the stripper (23). The adjusting device contains a pressure sensor (42, 53) which is used to detect the pressure of the material mixture upstream from the filter body and an actuator (43) which is connected to the pressure sensor, the actuator being used to adjust the pressure of the stripper (23) according to the pressure detected by the pressure sensor.

20 Claims, 4 Drawing Sheets

U.S. PATENT DOCUMENTS

| | | | |
|---|---|---|---|
| 4,470,904 A | 9/1984 | Gail et al. | |
| 6,227,380 B1 | 5/2001 | Bacher et al. | |
| 6,378,705 B1 * | 4/2002 | Bacher et al. | 210/397 |
| 6,607,299 B1 * | 8/2003 | Bacher et al. | 366/87 |

FOREIGN PATENT DOCUMENTS

| | | |
|---|---|---|
| EP | 0160782 | 10/1982 |
| EP | 0 615 829 | 3/1994 |
| WO | WO 93/15819 | 8/1993 |
| WO | WO 94/17981 | 8/1994 |
| WO | WO 97/26973 | 7/1997 |

OTHER PUBLICATIONS

International Search Report PCT/EP2004/011999.
International Preliminary Report on Patentability PCT/EP2004/011999.
Written Opinion PCT/EP2004/011999.

* cited by examiner

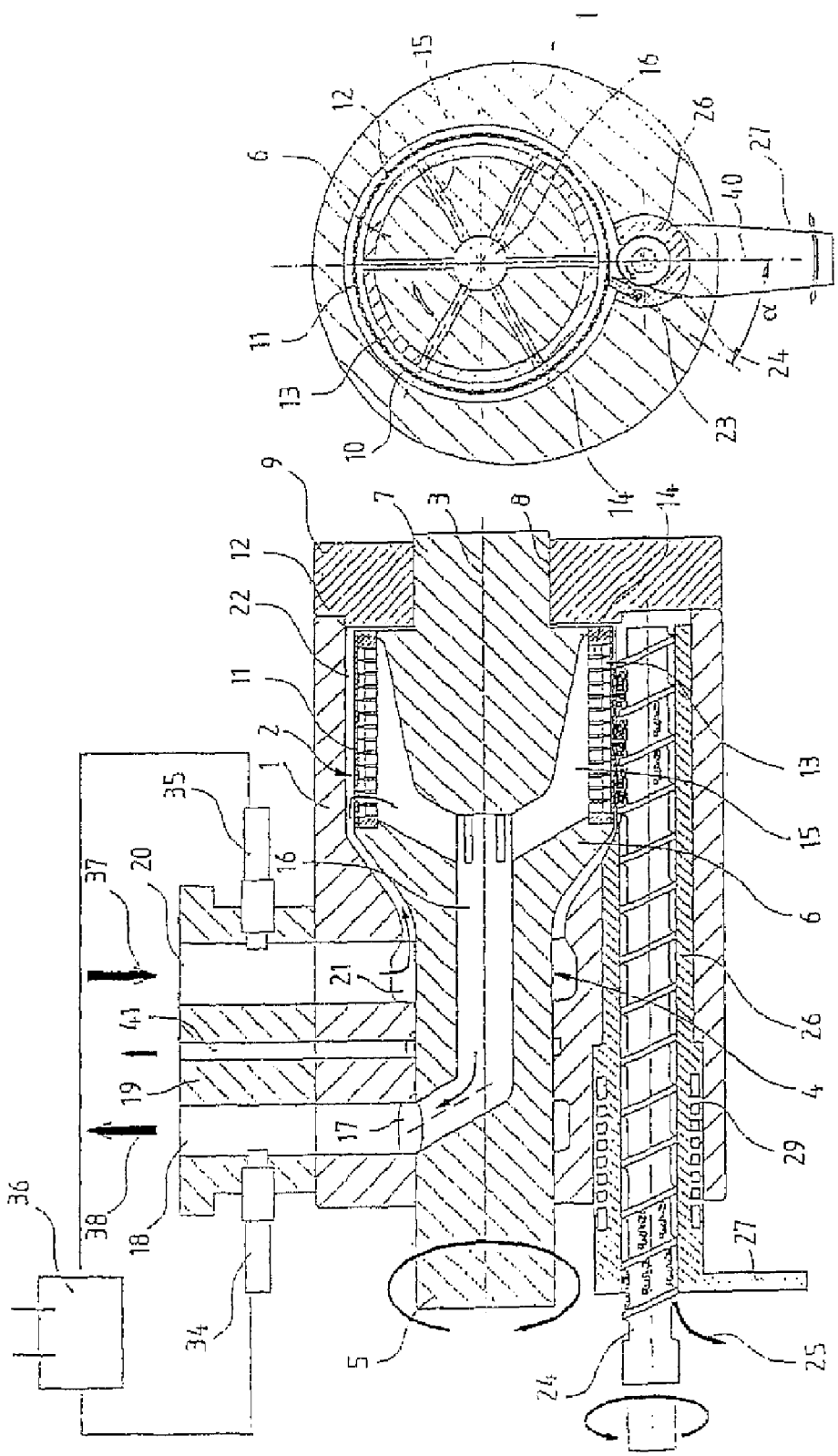

DEVICE FOR CONTINUOUSLY FILTERING MATERIAL MIXTURES

FIELD OF THE INVENTION

The invention relates to a device for continuously filtering material mixtures, particularly for separating impurities from plastic melts.

BACKGROUND OF THE INVENTION

Used plastics or plastic waste typically have high percentages of foreign materials, e.g., metal parts, paper residue, glass, secondary plastics, and the like. Usually, these foreign materials or impurities must be removed before the plastics are reused. This is realized in several ways such that the used plastics are first plasticized by heating and the plastic melts are then filtered. For this purpose, so-called melt filters are used, through which the metallic or non-metallic foreign materials or higher melting point plastics are separated. However, to enable continuous and uninterrupted filtering, the melt filter must be cleaned continuously.

From U.S. Pat. No. 4,470,904, a separating device according to the class is known, in which the contaminated plastic melts are pressed into the interior of a hollow, cylindrically-shaped filter body arranged in a housing. In the interior of the filter body, there is a rotationally driven stripper shaft, which is arranged coaxial to this filter body and which defines an inner annular space with the inner wall of the filter body and carries on its outer side several strippers at an angle to the axial direction and expanding into a spiral. The residue detained on the filter body on its inner side is transported to a material outlet opposite the inlet end of the inner annular space in the axial direction along the filter body by the strippers through the rotation of the stripper shaft. The strippers are elastically pressed from their inner side onto the inner surface of the filter body. However, in such elastic contact of the strippers, there is the problem that the strippers can be lifted from the surface of the filter body due to the pressure of the plastic melts and thereby lose their effectiveness. On the other hand, too high a contact pressure leads to increased friction between the filter body and the strippers, which is associated with accelerated wear.

SUMMARY OF THE INVENTION

The problem of the invention is to create a device of the type named above, which enables improved removal of the residue detained on the filter element.

This problem is solved by a device with the features of the invention. Various advantageous embodiments of the invention are also provided herein.

An essential advantage of the device according to the invention is that the contact pressure of the stripper can be automatically modified to the actual conditions without intervention from the outside. For example, if the pressure of the fed material increases, thereby increasing the risk of the stripper being lifted, according to the invention, the contact pressure of the stripper is also automatically increased without intervention from the outside. In contrast, if the pressure of the fed material drops, then the contact pressure of the stripper is also reduced accordingly, thereby decreasing the friction between the stripper and the filter element.

In a preferred embodiment of the invention, the pressure sensor is a hydraulic pressure transducer, which detects the pressure of the fed material upstream from the filter element and converts it into a hydraulic control signal. The actuator consists of an adjusting cylinder connected to the hydraulic pressure transducer via a hydraulic line, through which the control pressure is converted into a contact pressure for the stripper.

However, the pressure sensor can also be an electronic pressure transducer, which delivers corresponding control signals for a pressure control valve or an electronic actuator.

In the device according to the invention, the filter residue is lifted from the filter surface in the radial direction and thus discharged on the quickest path from the filter surface. The residue is not pushed axially to the filter surface, so that the wear decreases and the stability of the device can be improved. Through the lower abrasive loads of the filter, simpler and more economical filters can also be used.

The material lifted by the stripper is preferably transported away by a spiral conveyor or the like. The Filter element and the spiral conveyor can be driven separately, so that a separate control of cleaning and foreign material discharge speed is enabled. Through such control, a very high foreign material concentration can be effected and thus also a high yield of the primary material. In a preferred configuration, the conveying device comprises a rotationally motor-driven spiral conveyor. The rpm values of the filter and the spiral conveyor can be controlled separately, whereby a very high impurity concentration for an optimally active filter surface can be achieved. According to the type of plastic, the filter and the spiral conveyor can have the same or opposite direction of rotation.

BRIEF DESCRIPTION OF THE DRAWINGS

Further special features and advantages of the invention emerge from the following description of a preferred embodiment with reference to the drawing. Shown are:

FIG. 1, a first embodiment of a separating device in a longitudinal section;

FIG. 2, a cross section of the separating device from FIG. 1;

DETAILED DESCRIPTION OF THE INVENTION

Figure 3:
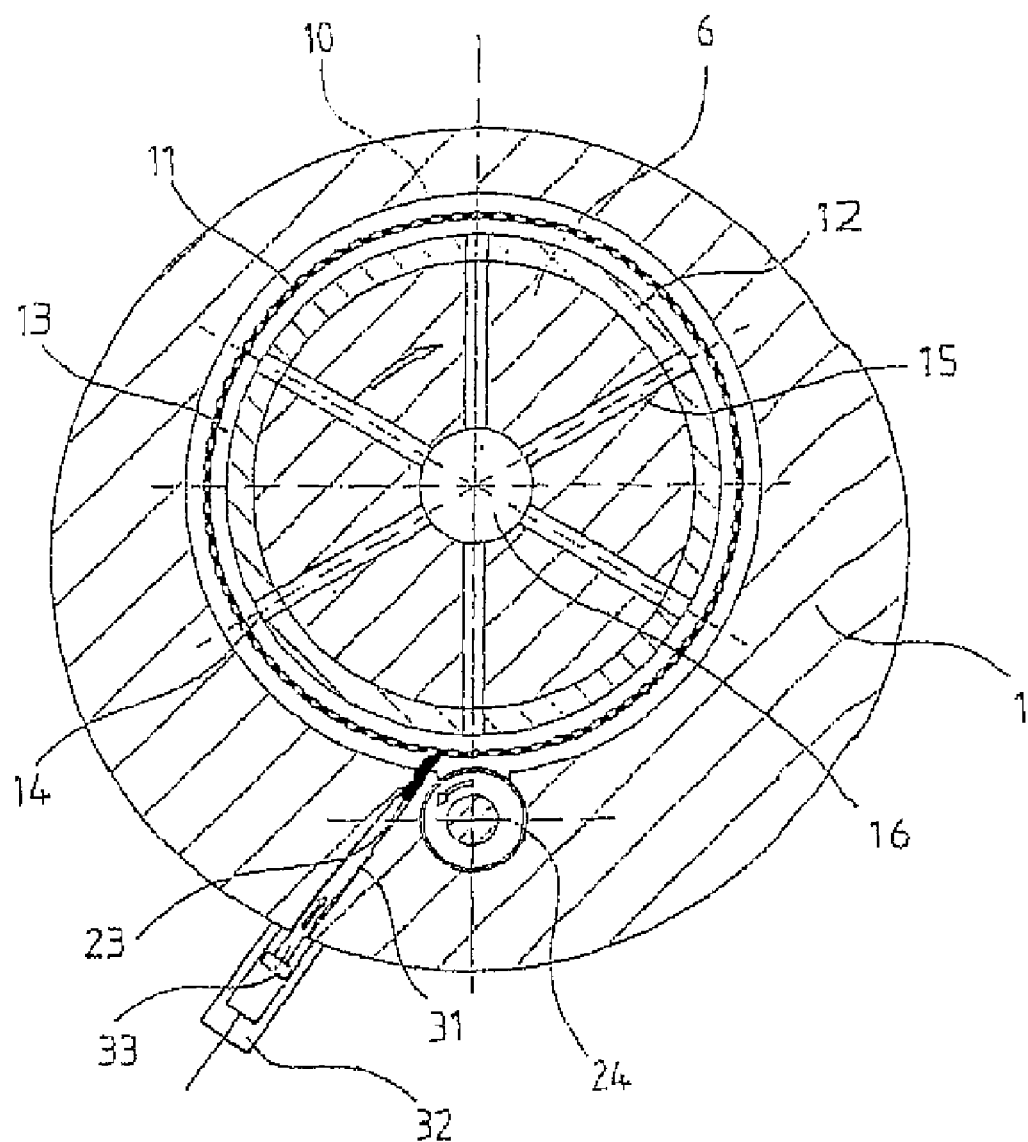
FIG. 3, a cross section of a second embodiment of a separating device.

The filter device shown schematically in FIG. 1 for filtering contaminated plastic melts includes a housing 1, in which a hollow, cylindrically-shaped filter element 2 is rotatably arranged about a center axis 3. The filter element 2 is mounted on a motor-driven carrier shaft 4. This includes a narrow driving part 5 mounted in the housing 1, a wider holding part 6 for the melt filter 2, and a narrow bearing journal 7, which is rotatably mounted in a corresponding bore 8 of a bearing cover 9 fixed on the housing 1.

The filter element 2 comprises a filter tube 11 provided with a plurality of radial through-holes 10 and a hollow, cylindrically-shaped support body 12, which is connected to the carrier shaft 4 with a positive fit and onto which the filter tube 11 is shrunken. The sieve-like filter tube 11 can be produced, e.g., from a steel sheet, which has through-holes 10, which is bent and then welded into a tube. Preferably, it is made from a wear-resistant and corrosion-resistant steel and hardened. The filter tube 11 can also be provided with surface coatings, through which the wear resistance and other properties can be improved. The through-holes 10 are configured as bores with a cross section expanding in the flow direction. The through-holes 10 can taper conically, e.g., outwardly. On its outer side, the hollow, cylindrically-shaped support body 12 has several collection channels 13 configured as circular grooves or flat threads. Several radial outflow bores 14 spaced apart at equal angular intervals in the peripheral direction lead inwards from these channels.

As is clear from FIGS. 1 and 2, the radial outflow bores 14 open into axial collection slots 15, which are distributed within the carrier shaft 4 at the same angular intervals as the outflow bores across the periphery of the expanded holding part 6 and which form an inner space for collecting the filtered material. The collection slots 15 expanding in the flow direction lead to a central collection channel 16, which opens via an inclined section into a first annular channel 17 within the housing 1. From the first annular channel 17, a first side bore within the housing 1 leads to an outlet channel 18 of a connection piece 19. In the connection piece 19 there is also an inlet channel 20, which leads via a second side bore within the housing 1 to a second annular channel 21 in the housing 1. This annular channel 21 connects to an annular space 22, which is limited between the inner wall of the housing 1 and the outer wall of the filter tube 11.

As is clear from FIG. 2, a stripper 23, in the form of a blade or a doctor, running in the axial direction over the entire length of the filter tube 11 and contacting the outer side of the filter tube is arranged in the lower part of the housing 1, such that the residue or impurities detained on the filter element 2 are discharged in the radial direction on the shortest path without being entrained over the filter element. The stripper 23 is arranged at an angle to the outer surface of the filter element 2 and towards the direction of rotation of the filter element. In the shown configuration, the stripper 23 is arranged, e.g., at a contact angle at in the area of 45° to a center plane 40 of the filter element 2 and is pressed against the outer wall of the filter tube 11 by a contact device, described in more detail below and shown schematically in FIG. 4. In the direct vicinity of the stripper 23, within the housing 1 there is a spiral conveyor 24, which is parallel to the center axis 3 of the filter element 2 and which is led along the outer side of the filter element 2 to an outlet opening. The spiral conveyor 24 is arranged such that the residue stripped radially by the stripper 23 is transferred directly to the spiral conveyor 24 and transported away to the outside from this conveyor in the direction of the arrow 25 of FIG. 1. In the configuration shown in FIG. 2, the stripper 23 is mounted on a hollow shaft 26, which surrounds the spiral conveyor 24 and which can rotate within the housing 1 and by means of an adjustment lever 27. Therefore, the contact angle α and the pressure force of the stripper 23 can be changed. In the hollow shaft 26, there are cooling channels 29 in the area of the material outlet of the spiral conveyor 24. Via these channels, the material transported through the spiral conveyor 24 can be cooled in order to form a thermal barrier.

The stripper 23 can also be mounted at a given angular position in the housing 1, as shown in FIG. 3. The stripper 23 is guided displaceably there in a diagonal slot 31 in the housing 1 and is pressed against the outer side of the filter tube 11 by an actuator of a contact device, described in more detail below.

On the connection port 19, in the area of the inlet channel 20 there is an input-side mass pressure sensor 35, and in the area of the outlet channel 18 there is an output-side mass pressure sensor 34. These are connected to control electronics 36 for controlling the filter device. Thus, e.g., the rotational movement of the filter body 2 and the spiral conveyor 24 can be controlled as a function of a detected differential pressure by means of the control electronics 36. Therefore, it is possible to allow the filter element 2 and the spiral conveyor 24 to turn intermittently according to two given pressure values (max-min) and thus to reduce wear. Between the inlet channel 20 and the outlet channel 18 there is a drainage channel 41 through the connection port 19 and the housing 1. In this way, portions of foreign material can be prevented from reaching the side of the goods via the bearing position.

Figure 4:
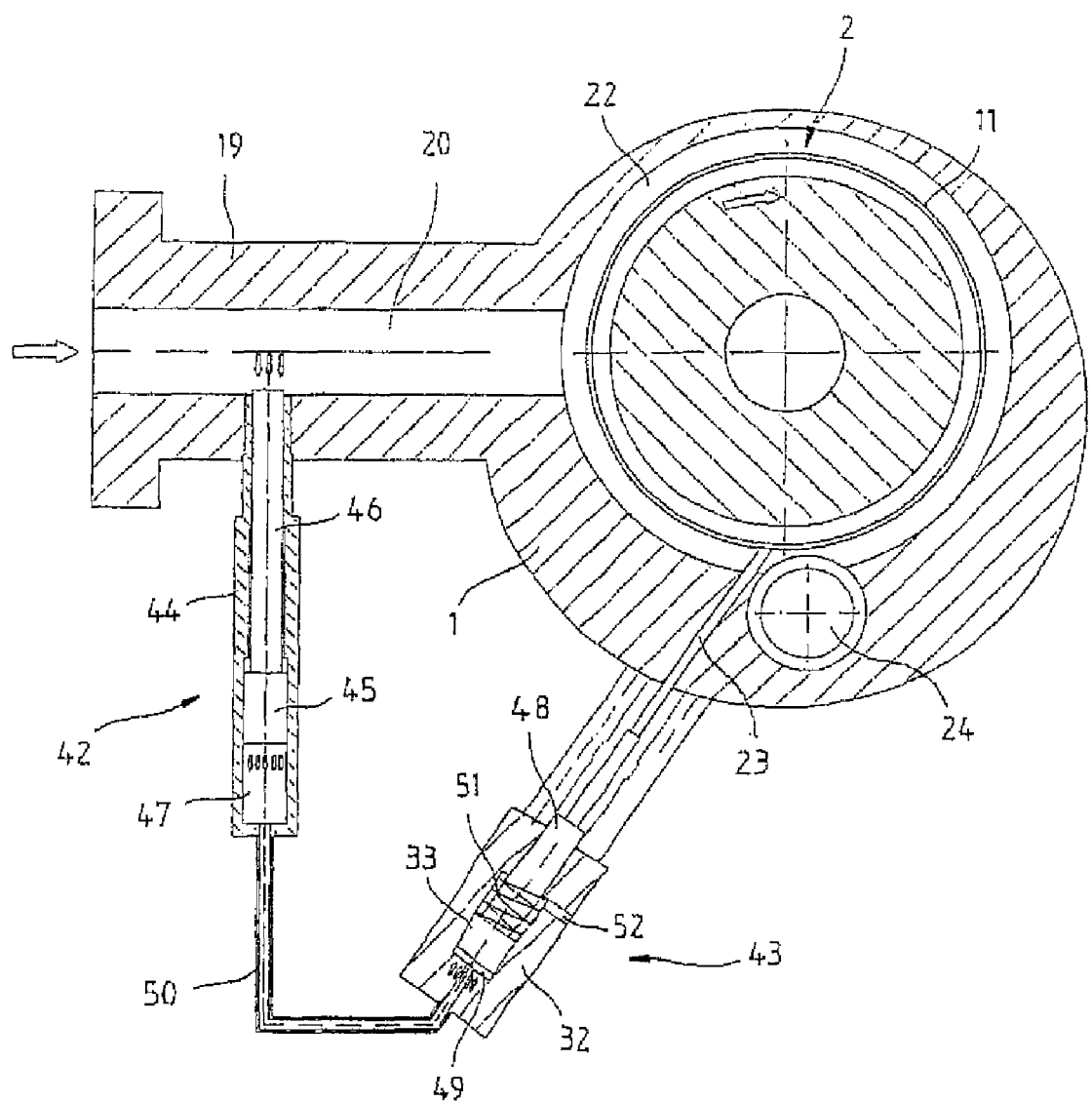
FIG. 4, a first embodiment of a contact device for pressing a stripper onto the filter tube, and FIG. 5, a second embodiment of a contact device.

In FIG. 4, a first embodiment of a contact device for pressing the stripper 23 configured in the form of a blade or an edge against the outer side of the filter tube 11 as a function of the pressure of the fed material mixture is shown. The contact device comprises a pressure sensor 42 for detecting the pressure of the material mixture upstream from the filter element 2 and an actuator 43 connected to the pressure sensor 42 for setting the contact pressure of the stripper 23 as a function of the pressure detected by the pressure sensor 42. For the hydraulic contact device shown in FIG. 4, the pressure sensor 42 is a hydraulic pressure transducer with a pressure piston 45, which can move within a piston housing 44 and which is connected on one of its ends to a pressure bolt 46 extending opposite the piston housing 44, A pressure chamber 47 filled with hydraulic fluid is defined by the other end of the pressure piston 45 and the piston housing 44. The pressure sensor 42 is attached to the connection port 19, such that the pressure bolt 46 projects into the inlet channel 20.

The actuator 43 consists of an adjusting cylinder, which contains a pressure piston 33 displaceable within a cylinder housing 32 with an outwardly projecting piston rod 48. The front end of the piston rod 48 is connected to the stripper 23. With the cylinder housing 32, the rear end surface of the pressure piston 33 borders a pressure chamber 49, which communicates with the pressure chamber 47 of the pressure sensor 42 via a hydraulic line 50. Within the cylinder housing 32, there is a compression spring 51 for generating a restoring force acting on the pressure piston 33. The adjusting cylinder can also be configured as a double-acting differential cylinder with an additional pressure connection 52 for the return movement.

Via the pressure bolt 46, the pressure of the material fed through the inlet channel 20 is transferred to the pressure piston 45, which generates a corresponding control pressure in the pressure chamber 46. This control pressure is also in the pressure chamber 49 of the actuator 43 via the hydraulic line 50 and ensures that the stripper 23 is pressed against the filter tube 11 via the pressure piston 33 and the pressure rod 48. If the pressure in the inlet channel 20 rises, the stripper 23 is also pressed more strongly against the filter tube 11.

Figure 5:
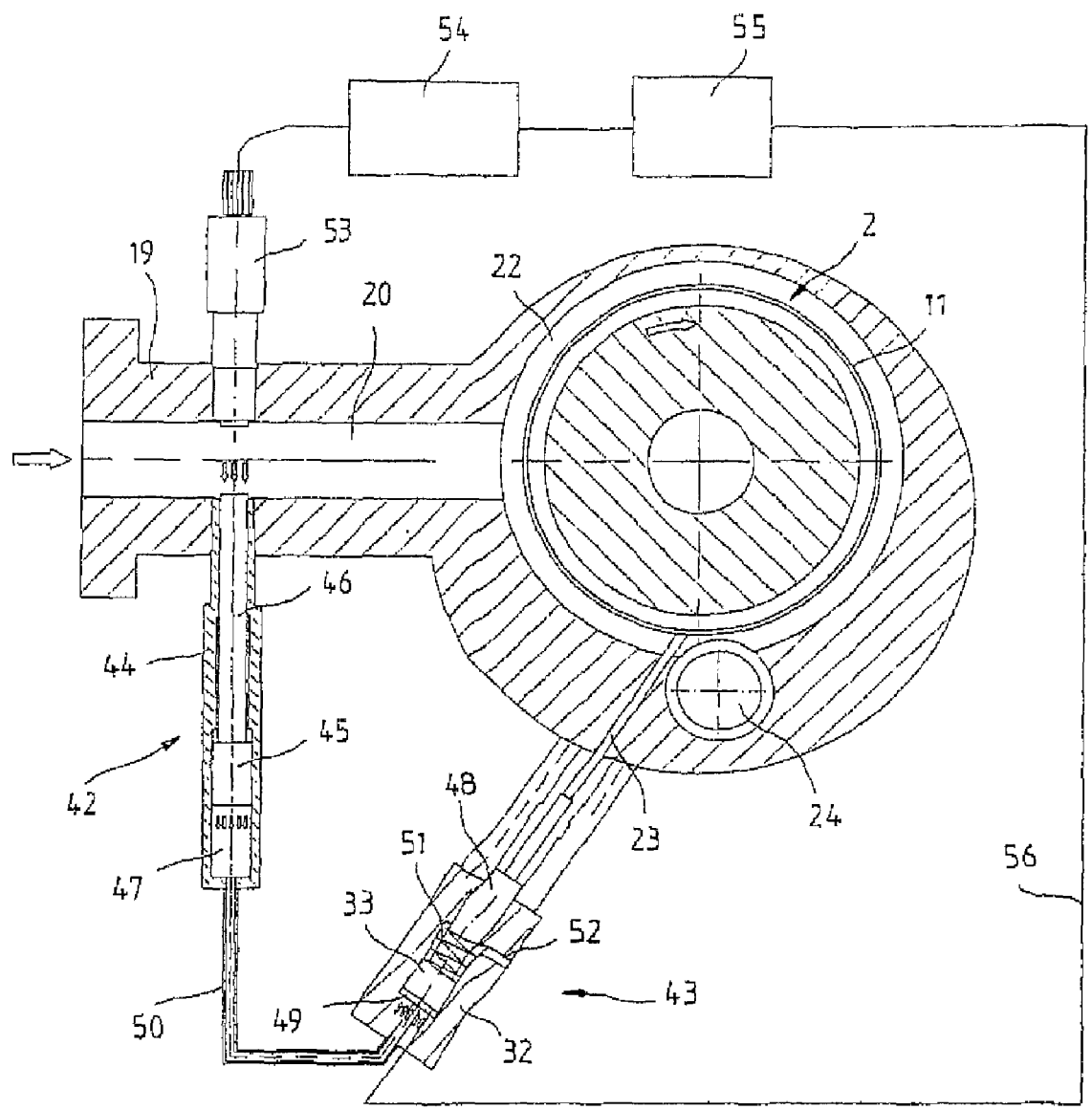

In FIG. 5, another possibility for a contact device is shown. There, an electric pressure transducer 53, which detects the pressure of the plastic melts within the inlet channel 20 and converts them into proportional electrical signals, is provided on the connection port 19. The signals delivered by the pressure transducer 53 are converted in control electronics 54 into corresponding control signals for a pressure control valve 55. The pressure control valve 55 is connected to the actuator 43 via a pressure line 56. Then, through the pressure control valve 55, the control pressure of the hydraulic actuator 43, and thus the contact pressure of the stripper 23, can be set as a function of the pressure detected by the pressure transducer 53.

In another embodiment, the actuator can also be configured as an electrical actuating drive, through which the contact pressure of the stripper 23 is set automatically as a function of the pressure detected by the electric pressure transducer 53.

In the previously described device, the non-treated material mixture (predominantly plastic mass) according to FIG. 1 is pressed at the inlet opening 20 in the direction of arrow 37 under pressure into the annular space 22 and through the fine through-holes 10 in the filter tube 11 of the rotating filter body 2. The filtered material is led via the filter tube 11 and the support body 12 with the collection grooves 13 and the discharge bores 14 via the carrier shaft 6 to the outlet opening 18 and there can be removed in the arrow direction 38. The residue retained at the filter tube 11 is lifted away by the stripper 23 when the filter tube 11 rotates and transferred directly to the rotating spiral conveyor 24 without further contacting the filter. The residue can then be transported from the spiral conveyor 24 to an output and can there be discharged in the arrow direction 25.

The invention is not restricted to the previously described embodiment. Thus, filtering can also be performed, e.g., with a flow direction directed from the inside outwards, wherein the stripper is then attached to the inner side of the hollow, cylindrically-shaped filter body. The filter element can also be stationary and the stripper can rotate.

The invention claimed is:

1. A device for continuously filtering material mixtures, especially for separating impurities from plastic melts, the device usable in an apparatus having at least one stripper operable to remove impurities detained on a filter element, the device comprising:
   a contact member operable to press the stripper against the filter element;
   a pressure sensor for detecting the pressure of the material mixture upstream from the filter element; and
   an actuator connected to the pressure sensor and the contact member, operable to set a pressure applied to the stripper by said contact member, whereby a contact pressure of the stripper against the filter element is a function of the pressure detected by the pressure sensor.

2. The device according to claim 1, wherein the pressure sensor is a hydraulic transducer cylinder.

3. The device according to claim 2, wherein the hydraulic transducer cylinder contains a pressure piston displaceable within a piston housing, and a pressure bolt projecting into an inlet channel.

4. The device according to claim 1, wherein the actuator is a hydraulic adjusting cylinder.

5. The device according to claim 4, wherein the hydraulic adjusting cylinder contains a pressure piston displaceable within a cylinder housing and the contact member is a piston rod connected to the stripper.

6. The device according to claim 1, wherein the pressure sensor and the actuator are connected to each other via a hydraulic line.

7. The device according to claim 1, wherein the pressure sensor is an electric pressure transducer.

8. The device according to claim 7, wherein the electric pressure transducer is connected to the actuator via control electronics and a pressure control valve.

9. The device according to claim 1, wherein the filter element is motor-driven and is rotatable about a center axis.

10. The device according to claim 1, wherein the stripper is arranged at a diagonal angle with respect to a rotational axis of the filter element.

11. The device according to claim 1, wherein the stripper is arranged at a contact angle relative to a center plane of the filter element.

12. The device according to claim 11, wherein the contact angle of the stripper is variable.

13. The device according to claim 1, further including a rotatable spiral conveyor in the direct vicinity of the stripper for transporting away the impurities removed by the stripper from the filter element.

14. The device according to claim 13, wherein the filter element rotates and is motor-driven, and the spiral conveyor can be driven separately.

15. The device according to claim 13, wherein the filter element is rotatable, and the rotational speed of the spiral conveyor and filter element are separately controllable.

16. A device for continuously filtering material mixtures delivered to a filter element under pressure, comprising:
   a housing;
   a hollow, cylindrically-shaped filter element arranged within the housing;
   at least one stripper pressable against the filter element and operable to remove impurities filtered by the filter element due to a relative movement of the filter element and the stripper; and
   at least one contact assembly including
      a pressure sensor for detecting the pressure of the delivered material mixture, and
      an actuator connected to the pressure sensor and the stripper, operative to set a contact pressure of the stripper against the filter as a function of the pressure detected by the pressure sensor.

17. A device for continuously filtering material mixtures delivered to a filter element under pressure, comprising:
   a housing;
   a hollow, cylindrically-shaped filter element arranged within the housing;
   at least one stripper edge pressable in the direction of the filter element and operable thereby to separate impurities filtered by the filter element due to a relative rotational movement of the filter element and the stripper; and
   at least one contact assembly including
      a pressure sensor for detecting the pressure of the delivered material mixture, and
      an actuator connected to the stripper and responsive to the pressure sensor, the actuator operative to press the stripper in the direction of the filter element with a force which corresponds to the pressure detected by the pressure sensor.

18. The device of claim 17, wherein the actuator is selected from the group consisting of: electrically controlled pressure control valve, electric pressure transducer, hydraulic pressure transducer.

19. The device of claim 17, wherein one of the filter element or stripper rotates in relation to the other.

20. The device of claim 17, further comprising:
   rotational waste removal means for conducting waste away from the stripper; and
   means for controlling a rotational speed of said filter element and said rotational waste removal means whereby the relative speed of the waste removal means and said filter element are independently controllable.

* * * * *